United States Patent [19]
Clymer, deceased et al.

[11] 3,937,095
[45] Feb. 10, 1976

[54] SELF ADJUSTING ELEVATOR
[75] Inventors: Joseph D. Clymer, deceased, late of Fort Wayne, Ind., by Bonita E. Clymer, special administratrix, Fort Wayne, Ind.
[73] Assignee: Lincoln Manufacturing Company, Inc., Fort Wayne, Ind.
[22] Filed: Oct. 24, 1974
[21] Appl. No.: 517,505

[52] U.S. Cl. .................... 74/224; 74/577 S; 187/3; 220/93
[51] Int. Cl.².... F16H 7/00; B66B 9/00; B65D 25/10
[58] Field of Search ............. 220/93; 187/3; 74/224, 74/225, 222, 575, 577 R, 577 S

[56] References Cited
UNITED STATES PATENTS

| | | | |
|---|---|---|---|
| 3,339,795 | 9/1967 | Cappel | 220/93 |
| 3,694,044 | 9/1972 | Cummings | 220/93 X |
| 3,717,397 | 2/1973 | Cummings | 220/93 X |
| 3,822,840 | 7/1974 | Stephenson | 74/575 |

*Primary Examiner*—Leonard H. Gerin
*Attorney, Agent, or Firm*—Albert L. Jeffers; Roger M. Rickert

[57] ABSTRACT

A self adjusting elevator, especially for use in a storage cabinet, or the like, which has a recess in which the elevator is horizontally disposed and within which the elevator is vertically moveable in conformity with the weight carried thereby. The elevator according to the present invention has a spring device incorporated therein which maintains tension on cables which support the elevator. As the elevator is unloaded, by removing articles therefrom, the elevator rises in the recess of the storage compartment thereby maintaining the articles thereon within easy reach. The elevator according to the present invention is particularly characterized in an improved arrangement for adjusting the spring device carried by the elevator thereby to modify the tension exerted on the aforementioned cables by the spring device.

5 Claims, 4 Drawing Figures

SELF ADJUSTING ELEVATOR

The present invention relates to improvements in spring biased elevators, especially for storage cabinets and the like.

Elevators of the type which are spring biased in the upward direction so as to assume a level corresponding to the load carried thereby are known. Such elevators are employed, in general, for supporting layers of articles which are removed, layer by layer, from the elevator. With a spring biased elevator, the uppermost layer of such articles is always maintained at about the proper level for easy handling.

A particular use for a spring loaded elevator of the nature referred to is in respect of storage cabinets in which food trays are placed for dispensing in institutions, such as schools, or the like. In such a case, the elevator is employed for supporting packets of food and these packets are maintained at the proper temperature within the storage compartment until it is time for the packets to be dispensed. Food packets of this nature will vary substantially in weight due to variation in the weight of the contents thereof or of the container, from time to time, and is thus the case that it is often necessary to adjust the tension of the spring means associated with the elevator so that the uppermost layer of articles carried by the elevator will always be at the proper height for ready accessibility.

SUMMARY OF THE INVENTION

According to the present invention, a storage compartment is provided having at least one recess extending vertically therein, and, advantageously, rectangular when viewed in plan. Horizontally disposed in the recess is an elevator having a frame. Cables connected to the storage compartment near the upper end of the recess extend downwardly near the corners of the elevator frame and are there entrained about pulleys rotatably carried by the frame, and from these pulleys extend generally horizontally of the frames and are entrained about further pulleys rotatably carried by the frame. The frame also carries a shaft and rotatably mounted on the shaft is a cylinder and all of the cables extend to the cylinder and around the cylinder in one and the same circumferential direction to points of connection of the various cables to the cylinder. The shaft is held against rotation in the frame and the cylinder is spring biased on the shaft in a direction to wind up the cables and in this manner a predetermined lifting force is exerted on the elevator frame.

The shaft, according to the present invention is angularly adjustable in the frame and a detent mechanism in the form of a rachet wheel on the shaft and a spring biased pawl on the frame is provided to hold the shaft in adjusted position in the elevator frame. The spring loaded pawl can be disengaged from the shaft and the shaft turned in a direction to decrease tension on the spring when it is necessary in order to accommodate the elevator frame to decreased load conditions.

A particular feature of the present invention is to be found in the fact that the shaft is rotatable by a tool and disengagement of the pawl can be effected either manually or by a tool and for this reason there is little chance that the shaft will spin under the influence of the spring and which could harm the individual effecting adjustment of the spring tension of the cylinder device. The adjustment of the spring tension according to the present invention can readily be carried out in perfect safety, and fine adjustments can be made therein without the danger of losing the position which the shaft occupies in the elevator frame.

A primary object of the present invention is the provision of an automatic spring loaded elevated frame which will maintain a stack of layers of articles in such position that the uppermost layer of the stack is always at about the same height, thereby making it convenient for unloading the articles from the elevator frame.

A still further object is the provision of a spring loaded elevator frame of the nature referred to in which the bias of the spring which urges the frame upwardly is readily adjustable.

A still further object of the present invention is the provision of an arrangement for effecting adjustment of the loading spring of an automatic elevator frame which it is safe and easy to use.

These and other objects and advantages of the present invention will become more apparent upon reference to the following detailed specification taken in connection with the accompanying drawings, in which.

DETAILED DESCRIPTION OF THE INVENTION

Figure 1:
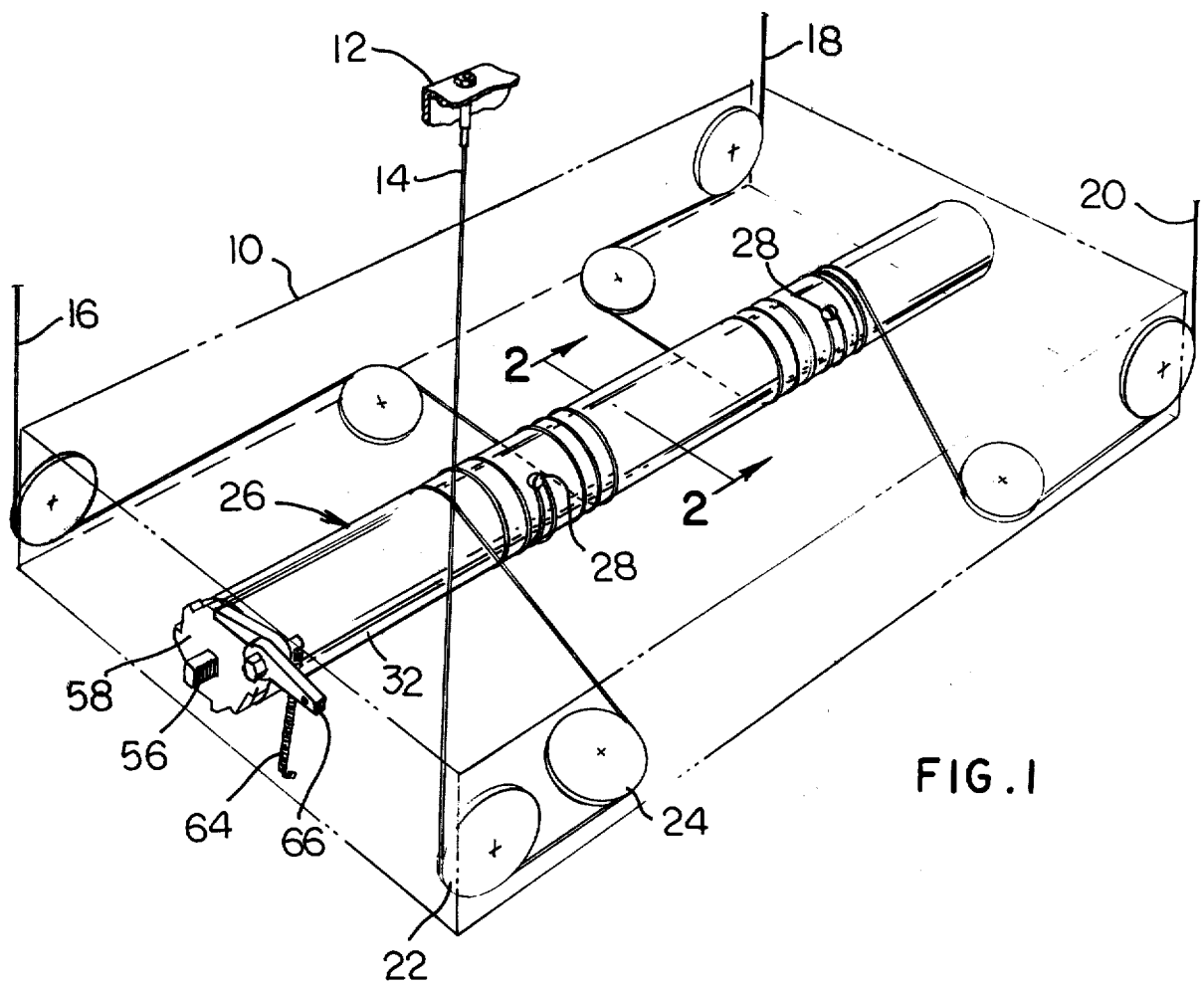
FIG. 1 is a somewhat schematic perspective view showing an elevator frame constructed according to the present invention.

Referring to the drawings somewhat more in detail, FIG. 1 illustrates a frame 10 for supporting stacks of articles, such as food packets, plastic or glass, or metal foil, or the like. The frame 10 is adapted for being mounted in a horizontal position in a vertically extending recess in a storage compartment or the like and is, of course, closed on the upper side by a panel.

The storage compartment includes in top of the recess therein, anchor elements 12, one of which is shown schematically in FIG. 1.

Each of the said anchor elements 12 has a respective cable 14, 16, 18 and 20 connected thereto and extending vertically downwardly therefrom and disposed near a respective corner of the frame 10. Cable 14 is entrained about a pulley 22 rotatably carried by frame 10 in the respective corner thereof and the cable then passes about another pulley 24 spaced inwardly of the frame from the corner thereof and which pulley 24 deviates the cable so that it extends inwardly toward the center of frame 10 into tangential engagement with a spring loaded cylinder arrangement generally indicated at 26.

The other cables 16, 18 and 20 are similarly entrained about pairs of pulleys which direct the respective cables as is shown in FIG. 1 in tangential direction toward the spring loaded cylinder arrangement 26 so that the cables will wrap therearound in one and the same circumferential direction. Each cable is connected to the cylinder as by a truss headed machine screw 28, of which there may be two in the cylinder as shown in FIG. 1.

Conveniently, cables 14 and 16 are made up of a single length of cable with the free ends connected to respective anchor elements 12 and with a single truss headed machine screw 28 connecting the midpoint of the cable to cylinder arrangement 26, as shown in FIG. 1. Similarly, cables 18 and 20 could be made up of a single length of cable in the same manner.

The general arrangement of the spring load cylinder and the cables leading therefrom about the guide pulleys, or deviating pulleys, and then upwardly to points of connection in the recess or well of the storage compartment is illustrated in the Cappel U.S. Pat. No. 3,339,795, and assigned to the same assignee as the present application.

As will be seen in FIGS. 2 and 3, the cylinder arrangement generally indicated at 26 in FIG. 1, comprises a central shaft 30 which is rotatably supported in frame 10 below the level of the top thereof; this positioning of the spring loaded cylinder arrangement permitting a cover panel to be placed on the frame to form a smooth elevator frame adapted for supporting articles.

Figure 3:
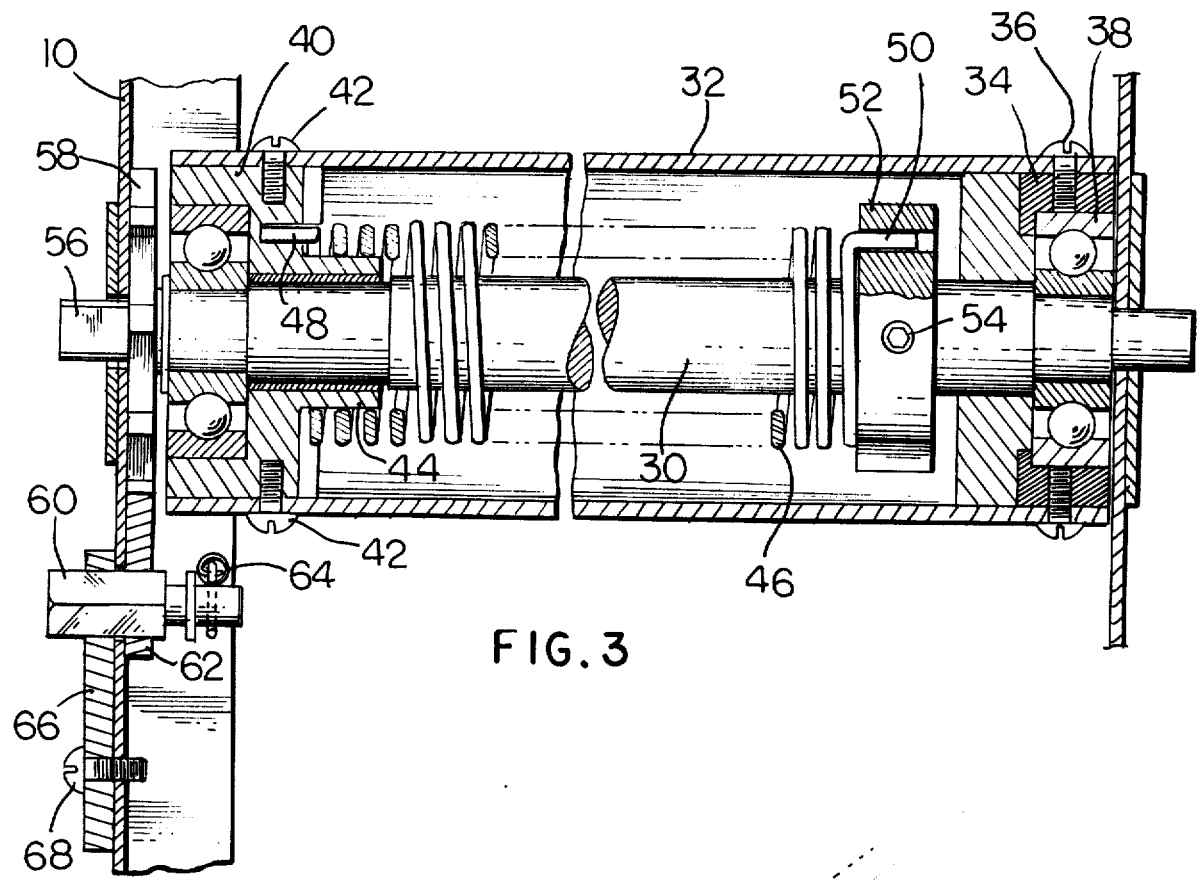
FIG. 3 is a plan sectional view substantially indicated by line III—III on FIG. 1, and partly broken away to permit the view to be drawn at increased scale.

Cylinder 32 is counterbored from each end, and at the right end in FIG. 3 has fitted therein a ring 34 which is held in place by screws 36. Ring 34 is provided with a recess for receiving an antifriction bearing 38 which is also in supporting engagement with the respective end of shaft 30.

At the other end of cylinder 32 in the corresponding counterbore there is the ring 40, which is held in place by screws 42 and which engages the outer race of a respective antifriction bearing, the inner race of which is seated on the adjacent end of shaft 30. Ring 40, furthermore, comprises an axially extending tenon portion 44 which fits inside the adjacent end of an elongated torsion spring 46. Torsion spring 46 has a bent off end 48 which is received in a hole in ring 40 and on the opposite end of the shaft a corresponding bent off end 50 of the spring is received in a hole in a collar 52 which is fixed to shaft 30 as by a set screw or roll pin 54.

At this point, it will be evident that the spring 46 biases shaft 30 and cylinder 32 for relative rotation. The spring is advantageously made of flat spring wire and the convolutions are quite close to one another so that several turns of cylinder 32 on shaft 30 are possible.

Figure 2:
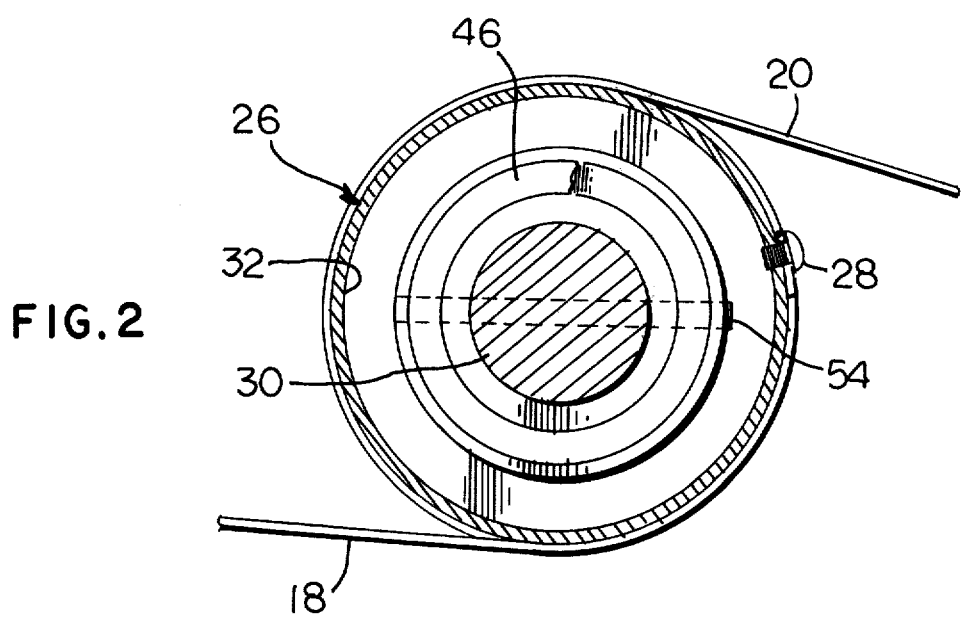
FIG. 2 is a transverse section through the spring biased actuating cylinder for the elevator frame and is indicated by line II—II of FIG. 1.

The left hand of shaft 30 is formed, as will be seen in FIGS. 2 and 3, with opposed flats 56 and nonrotatably mounted on the shaft 30 by means of a hole shaped to receive the flatted end of the shaft is a rachet wheel 58. This rachet wheel 58, as will be seen in FIG. 3, is disposed closely inside the adjacent end of frame 10. Pivotally mounted in frame 10 in spaced relation to shaft 30 is a further length of shaft 60 which, as will be seen in FIG. 4, maybe a hexongal shaft.

Shaft 60 is rotatable in frame 10 and on the end inside frame 10 has connected thereto a pawl means 62 which is biased by tension spring 64 into operative engagement with rachet wheel 58. Also mounted on shaft 60, but externally of frame 10, is a lever element 66 adapted for being fixedly secured to frame 10 as by screw 68.

More specifically, when pawl means 62 is in engagement with a tooth of rachet wheel 58 the lever element 66 can be secured to frame 10, thereby locking the pawl means and, therefore, rachet wheel 58 and shaft 30 in a predetermined rotated position in frame 10.

Rotation of shaft 30 will adjust the bias which spring 46 exerts on cylinder 32 and this can be accomplished by removing screw 68 from frame 10 to unlock pawl means 62.

Figure 4:
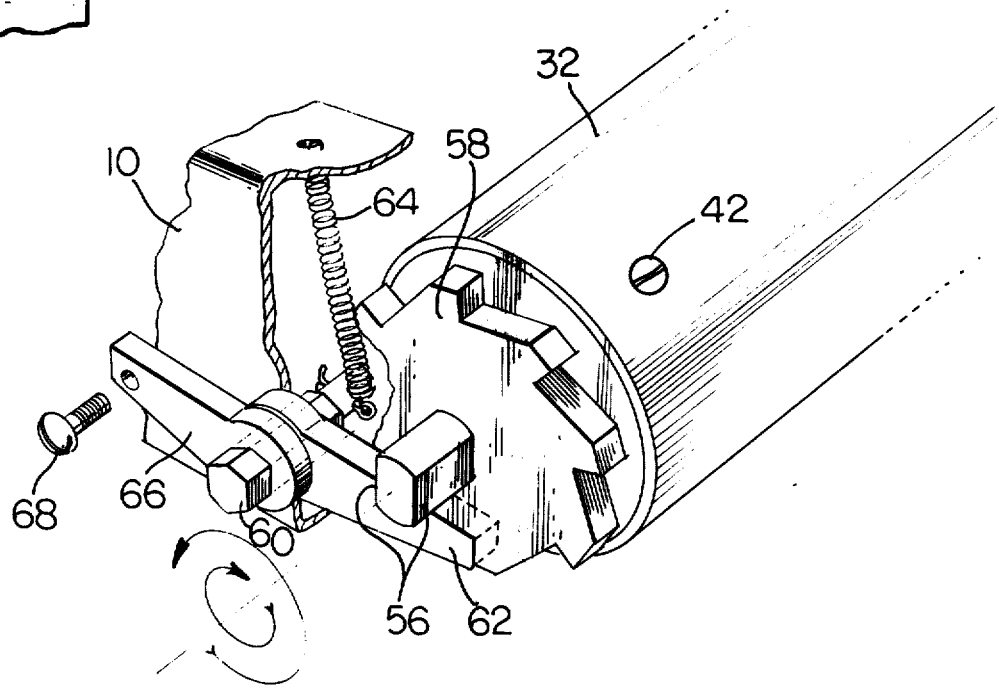
FIG. 4 is a fragmentary perspective view showing more in detail the ratchet wheel and pawl associated with the central shaft of the loading cylinder and the locking device therefor.

If spring 46 is to be tightened, a wrench applied to the flatted end of shaft 30 can be employed for rotating the shaft in a counterclockwise direction, as is viewed in FIG. 4, and when the desired spring tension has been reached and pawl means 62 is again in engagement with a tooth of rachet wheel 58, screw 68 can be returned to locking position.

If, on the other hand, the tension of the spring 46 is to be reduced, screw 68 is retracted from frame 10; a wrench, or crank, or other tool is connected to the flatted end of shaft 30, and the pawl means 62 is then disengaged from rachet wheel 58 by movement of lever element 66. The tool connected to shaft 30 can then be availed of for permitting the shaft to rotate in the clockwise direction until the spring 46 is again at the desired tension and whereupon the pawl means 62 is caused to engage a tooth of the ratchet wheel 58 and screw 68 is again put in locking engagement with the frame 10.

It will be seen that the adjustment of the tensioning spring 46 according to the present invention is quite simple and is, in particular, quite safe, because the shaft 30 is never released to the bias of spring 46 in such a manner that it can spin freely and cause damage to any of the parts of the apparatus, or cause injury to the individual effecting the adjustment of the tension of spring 46. The shaft 30 when rotating in one direction, namely, in spring tightening direction, is under the control of the ratchet wheel and pawl means and, when rotating in the opposite, spring loosening direction, is under the control of a tool connected to the shaft 30. The shaft is under control at all times, and the adjusting of the spring tension for the spring loaded cylinder device is thus quite safe and simple at all times.

Modifications may be made within the scope of the appended claims.

What is claimed is:

1. A weight responsive elevator frame for a storage cabinet having a vertical recess in which the frame is horizontally disposed, the frame being moveable upwardly in the recess as the weight thereon is reduced and vice versa, the frame having a cable extending substantially vertically upwardly from near each corner thereof and each connected at the upper end to a stationary anchor point in the cabinet near the upper end of the recess, a wind up cylinder carried by the frame and about which cylinder the cables are entrained in one and the same circumferential direction and to which the other ends of the cables are connected, a shaft in the frame on which the cylinder is rotatably supported, a torsion spring in the cylinder having one end connected to the shaft and the other end connected to the cylinder, the shaft having means on at least one end engageable from outside the frame for adjusting the angular position of the shaft in the frame, a ratchet wheel on the shaft, pawl means on the frame engaging said ratchet wheel to hold the shaft against the bias of the biasing spring, means biasing said pawl means toward operative engagement with said ratchet wheel, a lever element fixed to said pawl means for selectively disengaging said pawl means from said ratchet wheel, and means for connecting said lever element to the frame when the pawl means is in shaft holding engagement with said ratchet wheel.

2. An elevator frame according to claim 1 in which said ratchet wheel is adjacent the frame on the inside of the frame, said pawl means being pivotally mounted on the inside of the frame in the plane of said ratchet wheel, said lever element being on the outside of the frame, and shaft means extending through the frame and nonrotatably connecting the pawl means to the lever element.

3. An elevator frame according to claim 2 in which said shaft means has flats thereon and protrudes through said lever element for engagement by a wrench member for movement of said pawl means into ratchet wheel disengaging position when said lever element is disconnected from the frame.

4. An elevator frame according to claim 1 in which the frame is rectangular and has guide pulleys at the corners about which the respective cables are entrained, other pulleys in the frame spaced from the guide pulleys and distributed along opposite sides of the cylinder, the cables passing from the guide pulleys about respective ones of the other pulleys and leading therefrom tangentially to the cylinder.

5. An elevator frame according to claim 1 in which the shaft has opposed flats on one end, said ratchet wheel having a slot through which said one end of the shaft nonrotatably extends, said one end of said shaft being engageable by a tool for adjusting the angular position of the shaft to change the torsional bias exerted on the cylinder by the biasing spring.

* * * * *